US012525154B2

(12) United States Patent
Tanaka

(10) Patent No.: US 12,525,154 B2
(45) Date of Patent: Jan. 13, 2026

(54) SHIPBOARD ADVERTISING SYSTEM, SHIPBOARD ADVERTISING METHOD, AND SHIPBOARD ADVERTISING PROGRAM

(71) Applicant: NY CORPORATION, Tokyo (JP)

(72) Inventor: Ryosuke Tanaka, Tokyo (JP)

(73) Assignee: NY CORPORATION, Tokyo (JP)

( * ) Notice: Subject to any disclaimer, the term of this patent is extended or adjusted under 35 U.S.C. 154(b) by 0 days.

(21) Appl. No.: 18/864,002

(22) PCT Filed: Dec. 24, 2022

(86) PCT No.: PCT/JP2022/047796
§ 371 (c)(1),
(2) Date: Nov. 8, 2024

(87) PCT Pub. No.: WO2024/057565
PCT Pub. Date: Mar. 21, 2024

(65) Prior Publication Data
US 2025/0111808 A1  Apr. 3, 2025

(30) Foreign Application Priority Data

Sep. 16, 2022 (JP) ................................ 2022-148383

(51) Int. Cl.
*G09F 21/18* (2006.01)
*B60R 11/02* (2006.01)
(Continued)

(52) U.S. Cl.
CPC .......... *G09F 21/18* (2013.01); *B60R 11/0235* (2013.01); *G01S 19/45* (2013.01); *G09F 19/18* (2013.01)

(58) Field of Classification Search
CPC ..... G09F 21/18; G09F 19/18; B60R 11/0235; G01S 19/45
(Continued)

(56) References Cited

U.S. PATENT DOCUMENTS 1,647,883 A * 11/1927 Paxson ................... G09F 21/18
40/326
5,357,895 A * 10/1994 Ceko ....................... B63B 35/00
114/61.1
(Continued)

FOREIGN PATENT DOCUMENTS

CA       2132177 C  * 11/1999  ............. B63B 35/00
CN     107799019 A      3/2018
(Continued)

*Primary Examiner* — Stephanie E Bloss
*Assistant Examiner* — Kevin C Butler
(74) *Attorney, Agent, or Firm* — HEA Law PLLC

(57) ABSTRACT

Vessels navigating rivers or canals may be visible from the riverbanks or from bridges, requiring consideration not only for horizontal visibility but also for visibility from above. To address this, the invention features a shipboard advertising system that includes two display sections installed with a slant on the ship's main body, each supplied with advertising images. The top edges of the display sections are arranged closely together, while the bottom edges are spaced apart. The angle between the top edges ranges from 35° to 145°, enhancing visibility and enabling effective advertising tailored to the unique conditions of ship navigation.

9 Claims, 14 Drawing Sheets

(51) Int. Cl.
    *G01S 19/45*     (2010.01)
    *G09F 19/18*     (2006.01)

(58) Field of Classification Search
    USPC .......................................................... 359/443
    See application file for complete search history.

(56) References Cited

U.S. PATENT DOCUMENTS

| | | | | |
|---|---|---|---|---|
| 6,189,477 | B1* | 2/2001 | Cody | B63B 45/04 |
| | | | | 114/61.1 |
| 6,661,436 | B2* | 12/2003 | Barksdale | G06F 3/0481 |
| | | | | 715/788 |
| 7,449,998 | B1* | 11/2008 | Au | G09F 21/04 |
| | | | | 455/99 |
| 7,623,290 | B2* | 11/2009 | Liang | G03B 21/56 |
| | | | | 359/461 |
| 10,341,709 | B1* | 7/2019 | Wasserman | G06Q 30/0265 |
| 10,783,559 | B1* | 9/2020 | Tran | H04W 4/40 |
| 10,936,907 | B2* | 3/2021 | Suresh | G06V 10/82 |
| 2007/0121088 | A1* | 5/2007 | Liang | G03B 21/58 |
| | | | | 353/119 |
| 2008/0151100 | A1* | 6/2008 | Tsai | H04N 7/0122 |
| | | | | 348/E7.003 |
| 2011/0273613 | A1* | 11/2011 | Chavez | G06T 3/00 |
| | | | | 348/445 |
| 2016/0266246 | A1* | 9/2016 | Hjelmstad | G01S 15/86 |
| 2021/0217057 | A1* | 7/2021 | Fukazawa | G06Q 30/0265 |
| 2022/0254161 | A1* | 8/2022 | Tatrai | G06V 20/53 |

FOREIGN PATENT DOCUMENTS

| | | | | |
|---|---|---|---|---|
| CN | 110264923 A | * | 9/2019 | ............ G09F 21/18 |
| CN | 210575005 U | * | 5/2020 | |
| CN | 210793516 U | * | 6/2020 | |
| CN | 215340724 U | | 12/2021 | |
| CN | 220439175 U | | 2/2024 | |
| DE | 202010016719 U1 | * | 5/2012 | ......... G09F 15/0025 |
| EP | 1728951 A1 | | 12/2006 | |
| EP | 2388160 A1 | | 11/2011 | |
| EP | 3232257 A1 | | 10/2017 | |
| EP | 3916705 A1 | * | 12/2021 | ............ B63B 45/00 |
| FR | 1575639 | * | 3/1968 | |
| FR | 2480469 A1 | * | 10/1981 | |
| FR | 2629926 | * | 10/1989 | ............ G02B 30/25 |
| JP | 2007156939 A | | 6/2007 | |
| JP | 2009116510 A | * | 5/2009 | |
| JP | 2011077913 A | * | 4/2011 | |
| JP | 2011197276 | * | 10/2011 | ............ G06Q 50/00 |
| JP | 2012085192 | * | 4/2012 | ............... G06F 3/12 |
| JP | 5680776 B1 | * | 3/2015 | |
| JP | 2016006690 | * | 1/2016 | ............ G06F 13/00 |
| KR | 20120072131 A | | 7/2012 | |
| KR | 20190090652 A | | 8/2019 | |
| KR | 20200047929 | * | 5/2020 | ............ G06Q 30/02 |
| KR | 20220077513 | * | 6/2022 | ........... G06F 3/0481 |
| WO | WO-2017086728 | * | 5/2017 | ............ G06Q 30/02 |
| WO | 2023105611 A1 | | 6/2023 | |
| WO | WO-2024057565 A1 | * | 3/2024 | |

* cited by examiner (A)

(B)

(A)

(B)

(C)

(A)

(B)

SHIPBOARD ADVERTISING SYSTEM, SHIPBOARD ADVERTISING METHOD, AND SHIPBOARD ADVERTISING PROGRAM

TECHNICAL FIELD

The present disclosure is preferably applied, for example, to a shipboard advertising system that displays advertising images that are images for a variety of advertising, and to a vessel.

BACKGROUND ART

It is widely done to display advertising images on a display installed outside (see, for example, PTL1).

CITATION LIST

Patent Literature

PTL1: Japanese Patent No. 5680776

SUMMARY OF INVENTION

Technical Problem

Using vessels sailing on water for displaying advertising images is rare, and various conditions differ from, for example, those of the cases where displays are installed on trucks, which travel on roads, and on buildings.

Vessels sailing on rivers and canals may be viewed from riverbanks and bridges. Therefore, in order to achieve effective advertising, there is a demand to install displays in a manner suitable for conditions unique to vessels, taking into account the visibility of advertisements from above as well as in the horizontal direction, and so on.

The present disclosure is designed to solve the above problem, and an object of the present disclosure is to provide a shipboard advertising system, a shipboard advertising method, and a shipboard advertising program that achieve effective advertising from on board a vessel.

Solution to Problem

To solve the above problem, the present disclosure provides a shipboard advertising system including:
  a vessel body part capable of sailing on water;
  a first display unit disposed to be inclined on the vessel body part;
  a second display unit disposed to be inclined on the vessel body part; and
  an image providing unit configured to supply advertising images to the first display unit and the second display unit,
  wherein the first display unit and the second display unit are arranged in such a manner that a first top side of the first display unit and a second top side of the second display unit are in close proximity to each other, a second bottom side of the first display unit and a second bottom side of the second display unit are apart from each other, and the first and second top sides of the first and second display units in close proximity to each other form a top-side angle ranging from 35° to 145°.

Further, the present disclosure provides a shipboard advertising method including:
  in supplying advertising images to a first display unit and a second display unit disposed on a vessel body part capable of sailing on water, the first display unit and the second display unit being arranged in such a manner that a first top side of the first display unit and a second top side of the second display unit are in close proximity to each other, a second bottom side of the first display unit and a second bottom side of the second display unit are apart from each other, and the first and second top sides of the first and second display units in close proximity to each other form a top-side angle ranging from 35° to 145°,
  a first mode step of supplying the advertising images whose top sides are not continuous, to the first display unit and the second display unit, respectively, and
  a second mode step of supplying the advertising images whose top sides are continuous, to the first display unit and the second display unit, respectively.

Still further, the present disclosure provides a shipboard advertising program that causes a computer to perform:
  in supplying advertising images to a first display unit and a second display unit disposed on a vessel body part capable of sailing on water, the first display unit and the second display unit being arranged in such a manner that a first top side of the first display unit and a second top side of the second display unit are in close proximity to each other, a second bottom side of the first display unit and a second bottom side of the second display unit are apart from each other, and the first and second top sides of the first and second display units in close proximity to each other form a top-side angle ranging from 35° to 145°,
  a first mode step of supplying the advertising images whose top sides are not continuous, to the first display unit and the second display unit, respectively, and
  a second mode step of supplying the advertising images whose top sides are continuous, to the first display unit and the second display unit, respectively.

Still further, the present disclosure provides a shipboard advertising system including:
  a vessel body part capable of sailing on water;
  a display unit disposed on the vessel body part;
  a viewing distance calculation unit configured to calculate a viewing distance from the display unit to a viewer;
  an image selection unit configured to select an advertising image corresponding to the viewing distance; and
  an image providing unit configured to supply the selected advertising image to the display unit.

Advantageous Effects

The present disclosure provides a shipboard advertising system, shipboard advertising method, and shipboard advertising program that achieve effective advertising from on board a vessel.

DESCRIPTION OF EMBODIMENTS

Hereinafter, embodiments will be described with reference to the accompanying drawings.

First Embodiment

Figure 1:
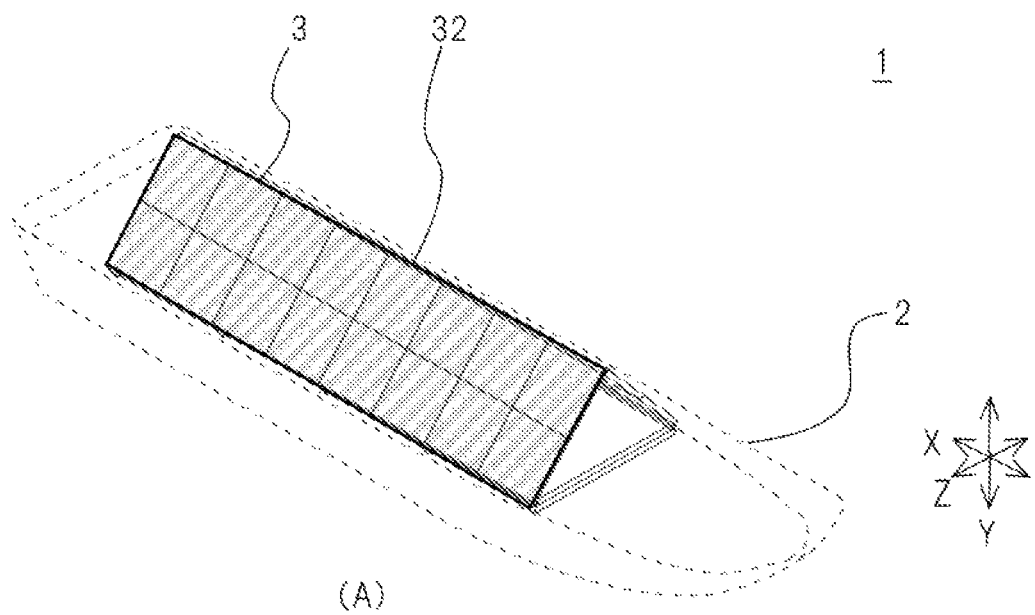
FIG. 1 includes schematic diagrams illustrating the configuration of a shipboard advertising system according to a first embodiment.
Figure 1:
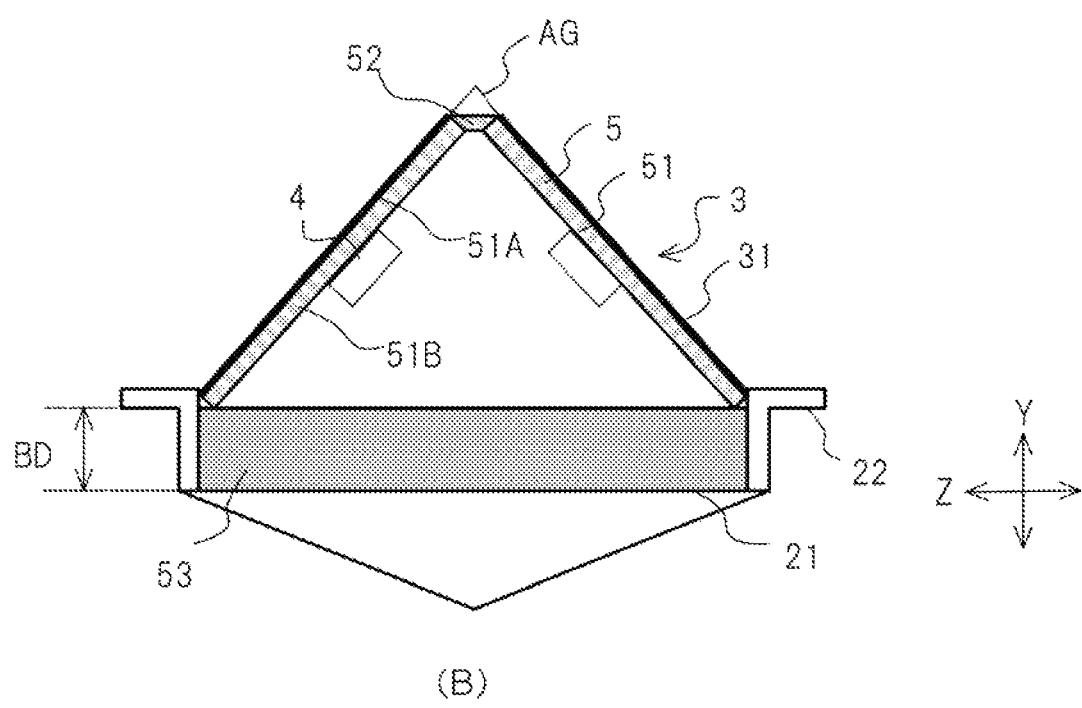

In FIG. 1, reference numeral 1 denotes a shipboard advertising system as a whole. The shipboard advertising system 1 includes an LED display set 3 disposed on a vessel body 2, and is an outdoor advertising system that displays advertisements targeted at viewers walking on riverbanks and embankments while sailing mainly on rivers and canals.

The light-emitting diode (LED) display set 3 is made up of a plurality of displays 31 that are LED displays. The number of displays 31 and the arrangement thereof are not particularly limited. Referring to FIG. 1, for example, 16 LED displays that are almost square are arranged in a 2-by-8 (=vertical (Y direction) by width (X direction)) array with almost no gap therebetween on one plane, thereby forming a flat panel set 32, and two flat panel sets 32 are arranged in a Z direction.

The two flat panel sets 32 are disposed to be inclined so that they are closest to each other at their tops (they form a triangle in cross section). The top-side angle AG of the intersection between the extensions of the front surfaces of the flat panel sets 32 from the top sides 32A thereof is preferably set to 35° to 145°, more preferably to 45° to 135° (60° in FIG. 1).

As illustrated in FIG. 1(B), two cabinets 51 in a flat shape are fixed to each other by an upper joining member 52, and are fixed to a lower installation base 53 using joining elements such as bolts or screws (not illustrated).

The lower installation base 53 is fixed to a deck 21 that is a floor of the vessel body 2, and serves to allow the cabinets 51 to be fixed thereto and to raise the bottom positions of the cabinets 51 by a rising amount BD. Therefore, the bottom end of each cabinet 51 is fixed at a position 10 to 30 cm (for example, 20 cm) lower than the top side of a bulwark 22, so that the lower ends of the front surfaces 31A of the displays 31 are located less than 20 cm, preferably less than 10 cm, from the top side of the bulwark 22.

The displays 31 are arranged on and fixed to the front surfaces (outer surfaces) 51A of the cabinets 51. In addition, an image providing device 4 is provided on the rear surfaces (inner surfaces) 51B) of the cabinets 51.

The image providing device 4 supplies image data serving as advertising images to the displays 31. The image data may be either still images or videos.

The image providing device 4 has a computer configuration, in which a control unit 41 made up of a central processing unit (CPU), read only memory (ROM), and random access memory (RAM) comprehensively controls the entire image providing device 4 and performs an image display process in accordance with an image display program stored in advance in a storage unit 45. In this connection, an operation input unit 46 is not mandatory.

The image providing device 4 may employ a streaming playback method that supplies advertising images sequentially received from an external information communication device to the displays 31 or a memory playback method that supplies advertising images stored in advance in the storage unit 45 to the displays 31. Assume here that the image providing device 4 employs the memory playback method.

More specifically, the control unit 41 of the image providing device 4 stores advertising images and a playlist received via an external interface 43 in the storage unit 45. The playlist shows an order in which the advertising images are played, the durations of playing the advertising images, and others. The control unit 41 supplies the advertising images to the displays 31 via the external interface 43 in accordance with the playlist. As a result, the advertising images are displayed on the displays 31.

As described earlier, the shipboard advertising system 1 is expected to move through rivers and canals along which many people walk. The rivers and canals have bridges over them, and many people walk on the bridges. In addition, embankments may be built at positions higher than the water levels along the rivers and canals, and sidewalks may often be provided on or below the embankments. In any case, people walk above the water levels, and the lines of sight start at their eye positions.

Figure 3:
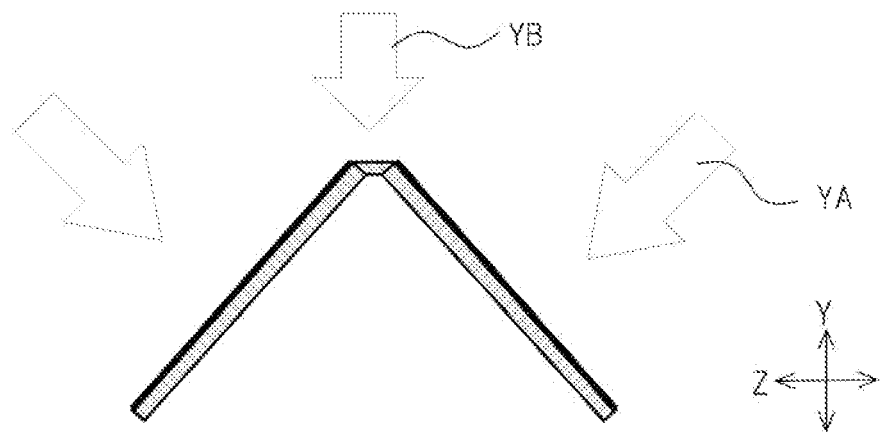
FIG. 3 includes schematic diagrams for describing a normal mode and a bridge mode.
Figure 3:
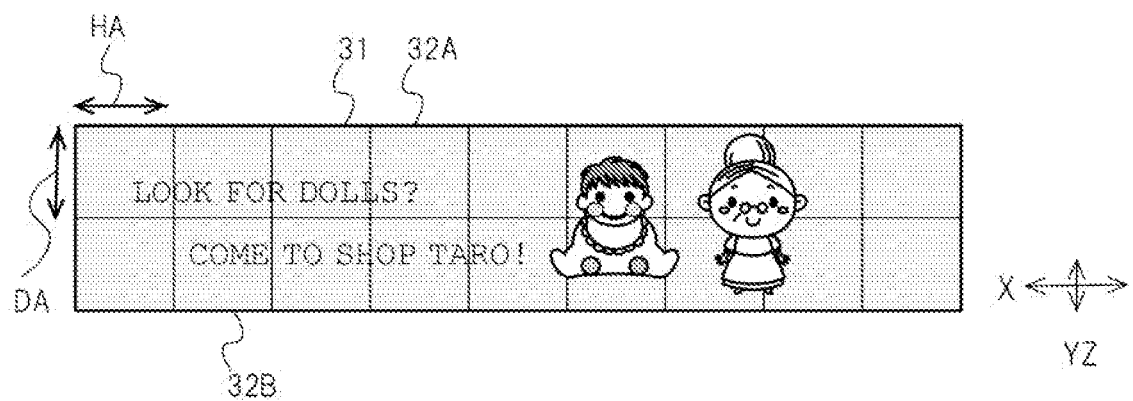
Figure 3:
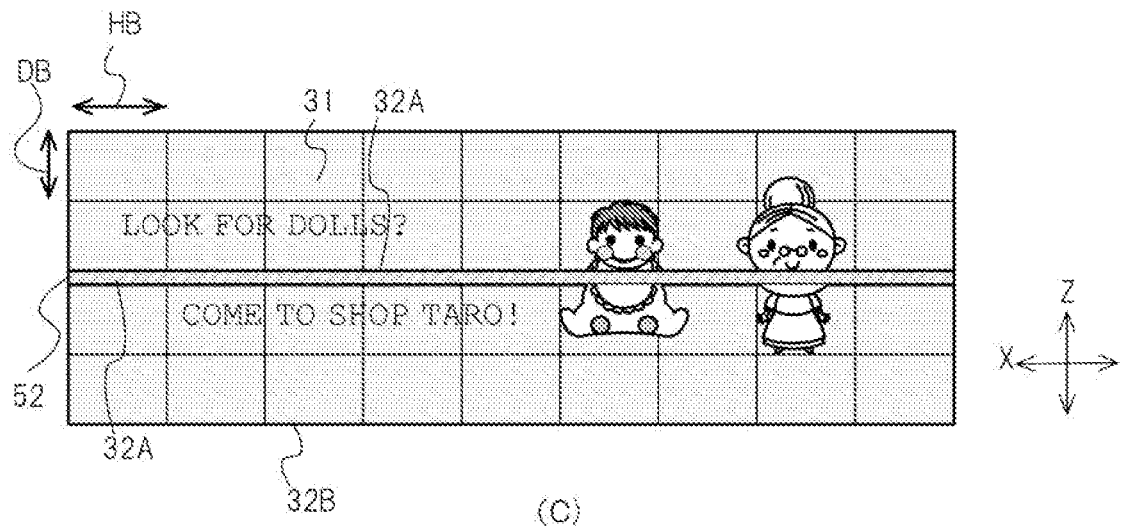

Thus, as illustrated in FIG. 3(A), when people walk on a sidewalk, they are likely to look down at the LED display set 3 in an oblique downward direction from above (in FIG. 3(A), 30° downward with respect to the horizontal), like an oblique downward line-of-sight YA. When people walk on a bridge, on the other hand, they are likely to look down at the LED display set 3 in a straight downward direction from above, like a straight downward line-of-sight YB (vertical downward direction).

In the shipboard advertising system 1 of the present disclosure, the two flat panel sets 32 are arranged in such a manner that their top sides 32A are in close proximity to each other and their bottom sides 32B are apart from each other. This arrangement enables people on a riverbank with a long sailing distance to view a flat panel set 32 at an almost right angle through the oblique downward line-of-sight YA, and also enables people on a bridge to view the two flat panel sets 32 through the straight downward line-of-sight YB.

In addition to the above-described configuration, the shipboard advertising system 1 of the present disclosure displays advertising images in a normal mode that is a first mode in which an advertising image is displayed in full screen on each flat panel set 32 and the advertising images respectively displayed on the flat panel sets 32 are not continuous. For example, the same advertising image may be displayed on both the flat panel sets 32 or different advertising images may be displayed on the flat panel sets 32.

Furthermore, the shipboard advertising system 1 displays advertising images in a bridge mode that is a second mode in which the advertising images are displayed so as to be continuous at the boundary of the top sides 32A. In this connection, the expression "advertising images are displayed so as to be continuous at the boundary of the upper sides" does not necessarily mean that they are actually connected to each other, as long as the advertising images displayed on the two flat panel sets 32 are recognized as one advertising image being continuous in the Z direction when viewed through the straight downward line-of-sight YB.

In addition, in the bridge mode, the advertising images are displayed with a vertical and horizontal ratio adjusted for viewing through the straight downward line-of-sight YB. More specifically, in the normal mode, the ratio of vertical direction DA and horizontal direction HA of an advertising image, when viewed through the oblique downward line-of-sight YA, is 1:1, and therefore normal advertising image data that is to display advertising images with the vertical and horizontal ratio adjusted to 1:1 on the displays 31 is supplied.

In the bridge mode, on the other hand, the ratio of vertical direction DB and horizontal direction HB of an advertising image, when viewed through the straight downward line-of-sight YB, is 2:3, and therefore bridge advertising image data that is to display advertising images with the vertical and horizontal ratio adjusted to 3:2 on the displays 31 is supplied. That is to say, although an advertising image that is actually displayed on the displays 31 (and is viewed through the oblique downward line-of-sight YA) is long in the Z direction, the vertical and horizontal ratio of the advertising image is visually 1:1 when the advertising image is viewed through the straight downward line-of-sight YB.

Figure 2:
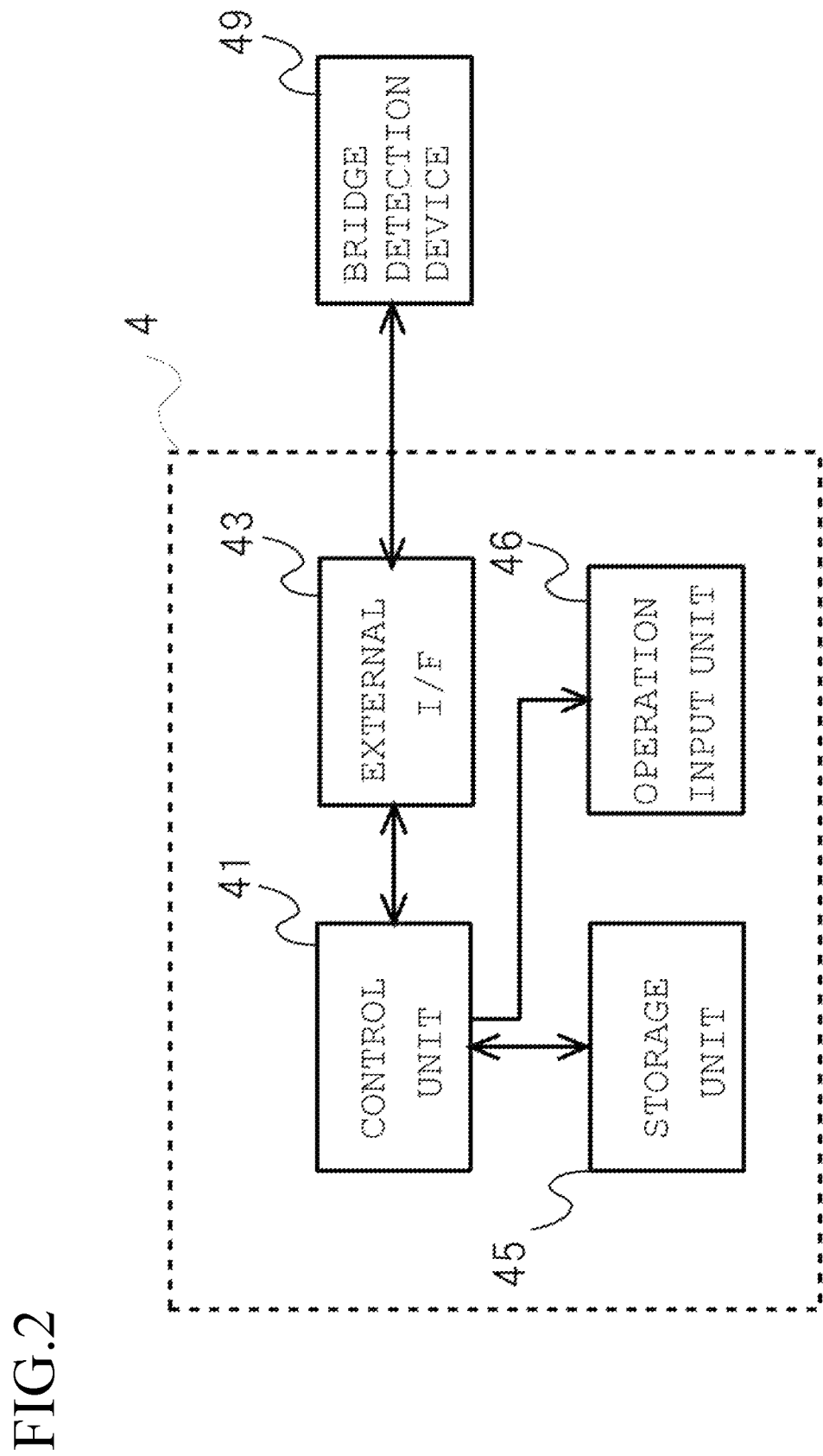
FIG. 2 is a schematic diagram illustrating an electrical block diagram of an image providing device.

More specifically, as illustrated in FIG. 2, a bridge detection device 49 is connected to the image providing device 4 via the external interface 43. For example, the bridge detection device 49 is a global positioning system (GPS) device that is installed in the vicinity of the vessel body front end in the sailing direction of the vessel body 2 and that detects the current position of the vessel body 2 using a distance measuring sensor, which detects the existence or absence of a bridge with laser light such as infrared light, or using a GPS satellite signal. In this connection, a part or whole of the bridge detection device 49 may be integrally formed with the image providing device 4.

The control unit 41 of the image providing device 4 monitors a measurement signal sent from the bridge detection device 49. When determining that the vessel body 2 is not in a bridge visible area with a predetermined distance, the control unit 41 transitions into the normal mode, thereby supplying advertising images that are not continuous at the boundary between the flat panel sets 32 to the displays 31.

By the way, the storage unit 45 of the image providing device 4 stores normal advertising image data for advertising images with the vertical and horizontal ratio adjusted in advance to 1:1, and bridge advertising image data. The playlist includes playback time information on a scheduled playback time or a duration from a playback start. The playlist also includes a normal advertisement identifier (ID) identifying the normal advertising image data and a bridge advertisement ID identifying the bridge advertising image data in association with playback instruction information.

For example, when the control unit 41 of the image providing device 4 detects that the vessel body 2 has entered the bridge visible area while supplying the normal advertising image data to the displays 31 in accordance with the playlist, the control unit 41 specifies the bridge advertising image data on the basis of the playback time information and bridge advertisement ID, and plays the bridge advertising image data from the point specified by the playback time information.

Then, when the control unit 41 detects that the vessel body 2 has left the bridge visible area while supplying the bridge advertising image data to the displays 31 in accordance with the playlist, the control unit 41 specifies the normal advertising image data on the basis of the playback time information and normal advertisement ID, and plays the normal advertising image data from the point specified by the playback time information.

In the manner described above, the image providing device 4 switches the advertising image data to be played (between the normal advertising image data and the bridge advertising image data) on the basis of whether the vessel body 2 is located inside or outside the bridge visible area.

In this connection, the bridge visible area is a desirably set threshold that defines a distance from the edge of a bridge, in a water flowing direction parallel to the flowing direction of a river. In the case of a bridge having a long distance from the water surface, the threshold is preferably set to a large value. In the case of a bridge having a short distance from the water surface, the threshold is preferably set to a small value. This is because, when viewed from a high position, an area where the water surface can be viewed at an almost right angle is expanded, and when viewed from a low position, the area where the water surface can be viewed at an almost right angle is narrowed.

Figure 4:
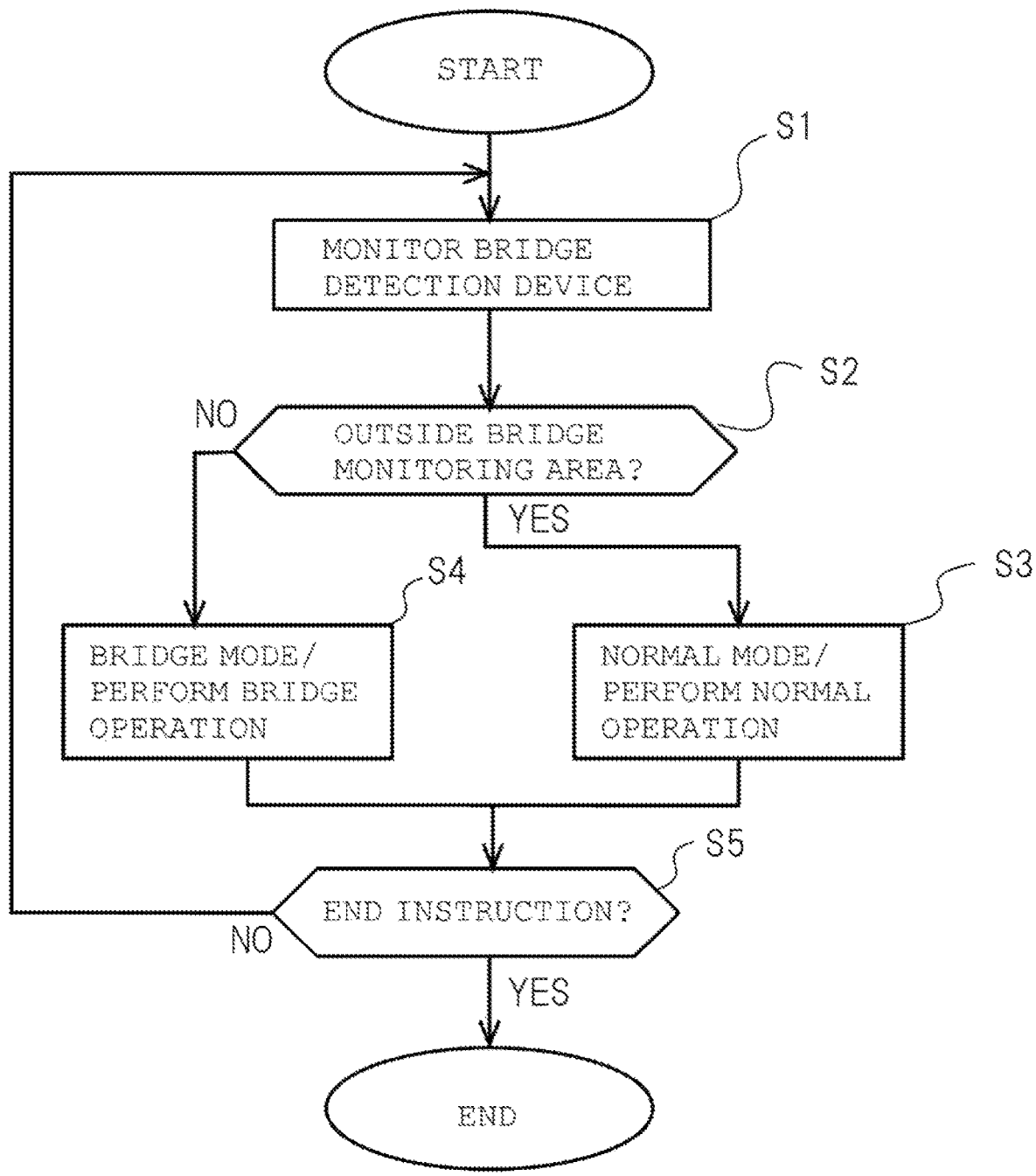
FIG. 4 is a flowchart for describing a shipboard advertising process.

The following describes the image display process that is performed by the control unit 41 of the image providing device 4 in accordance with the image display program, with reference to the flowchart of FIG. 4.

The control unit 41 of the image providing device 4 begins an advertising image playback process in response to a user operation on the operation input unit 46 or at a timer-set playback start time.

At step S1, the control unit 41 monitors the bridge detection device 49. At step S2, the control unit 41 determines whether the vessel body 2 is outside a bridge detection area. If an affirmative result is obtained, it means that there is no bridge nearby, and then the process proceeds to step S3.

At step S3, the control unit 41 performs a normal operation in a normal mode to supply normal advertising image data to the displays 31 in accordance with a playlist.

If a negative result is obtained at step S2, on the other hand, the process proceeds to step S4 in which the control unit 41 performs a bridge operation in a bridge mode to supply bridge advertising image data to the displays 31 in accordance with the playlist.

At step S5, the control unit 41 determines whether an end instruction has come, on the basis of an end instruction received via the operation input unit 46 and external interface 43 or the setting of the playlist. If a negative result is obtained, the process proceeds back to step S1, so that the control unit 41 keeps on the image display process.

If an affirmative result is obtained at step S5, the process proceeds to an end step, so that the control unit 41 completes the image display process.

Second Embodiment

A second embodiment will now be described. The second embodiment, which will be described with reference to FIGS. 5 and 6. In the second embodiment, components that are identical to those in the first embodiment are given the same reference numerals. Each component that has a counterpart in the first embodiment is given the reference numeral used in the first embodiment plus 100. The description of the identical components will be omitted.

Figure 5:
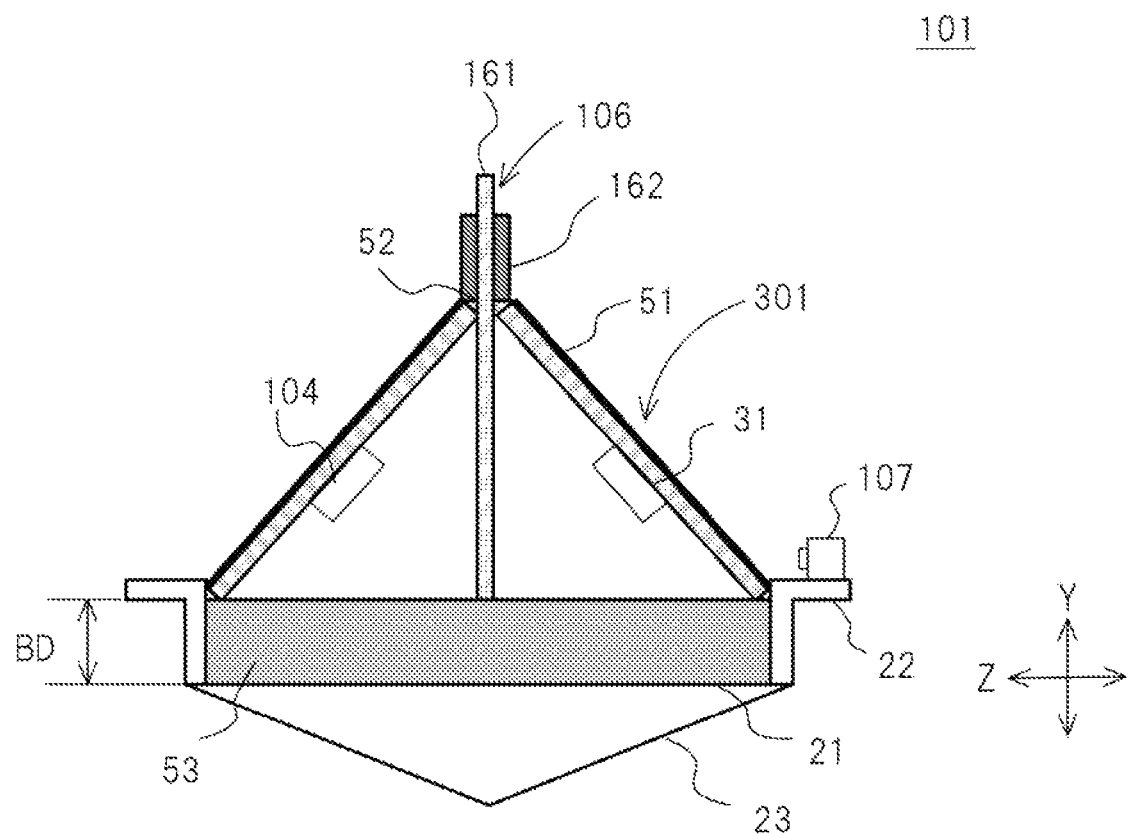
FIG. 5 is a schematic diagram illustrating the configuration of a shipboard advertising system according to a second embodiment.
Figure 6:
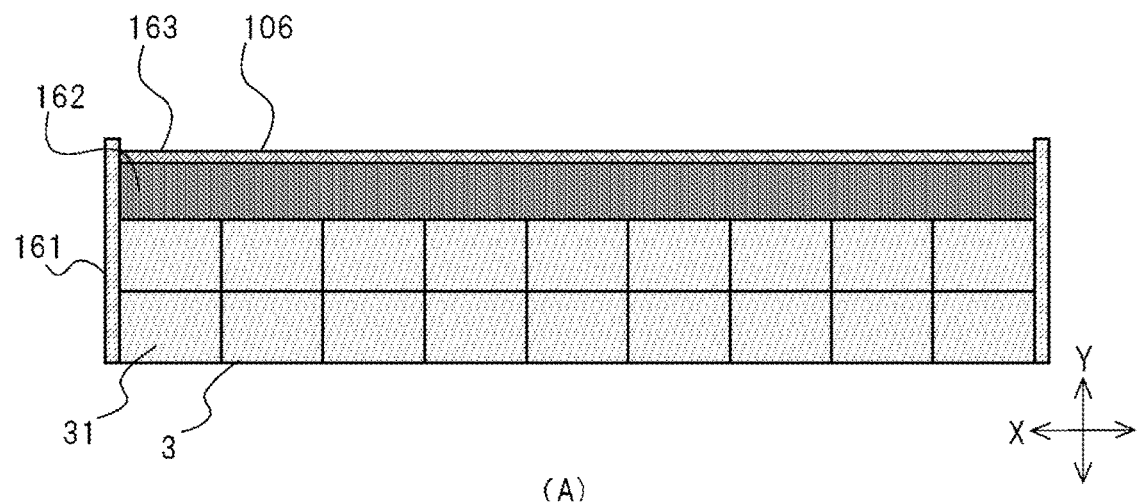
FIG. 6 includes schematic diagrams for describing the extension and retraction of a according to the second embodiment.
Figure 6:
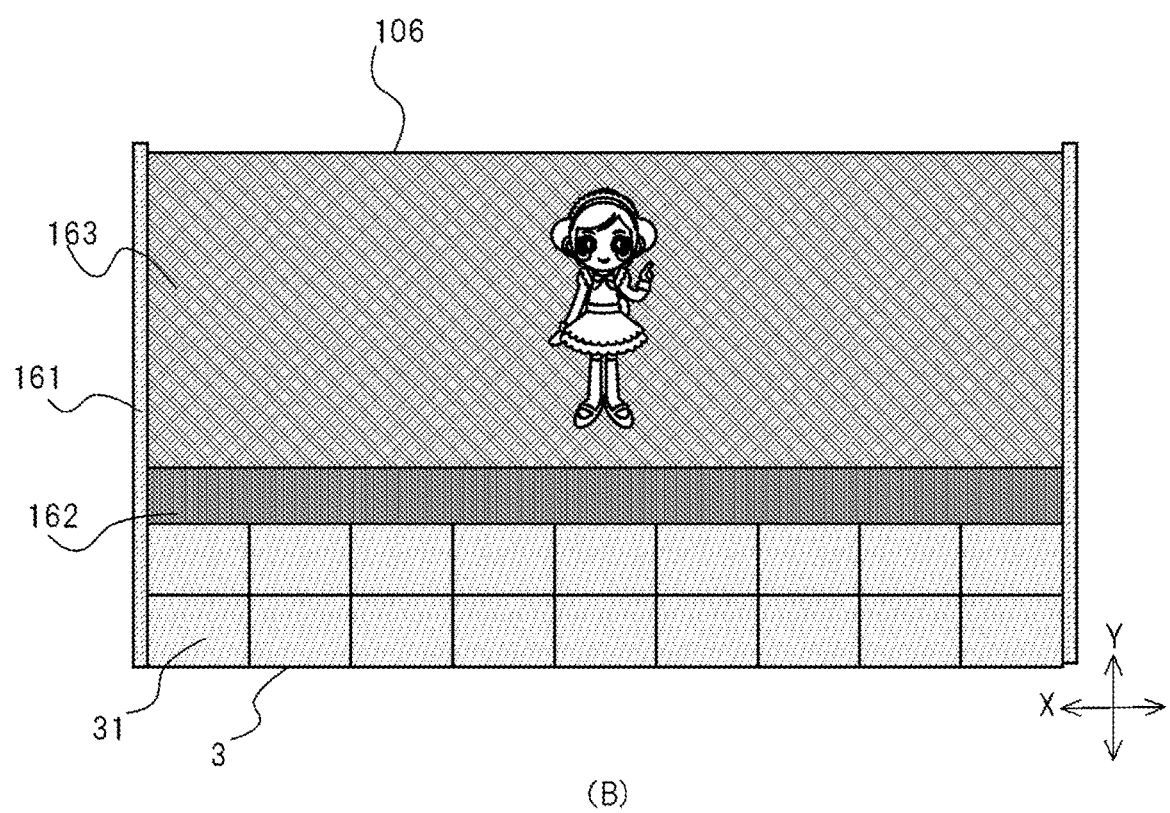
Figure 7:
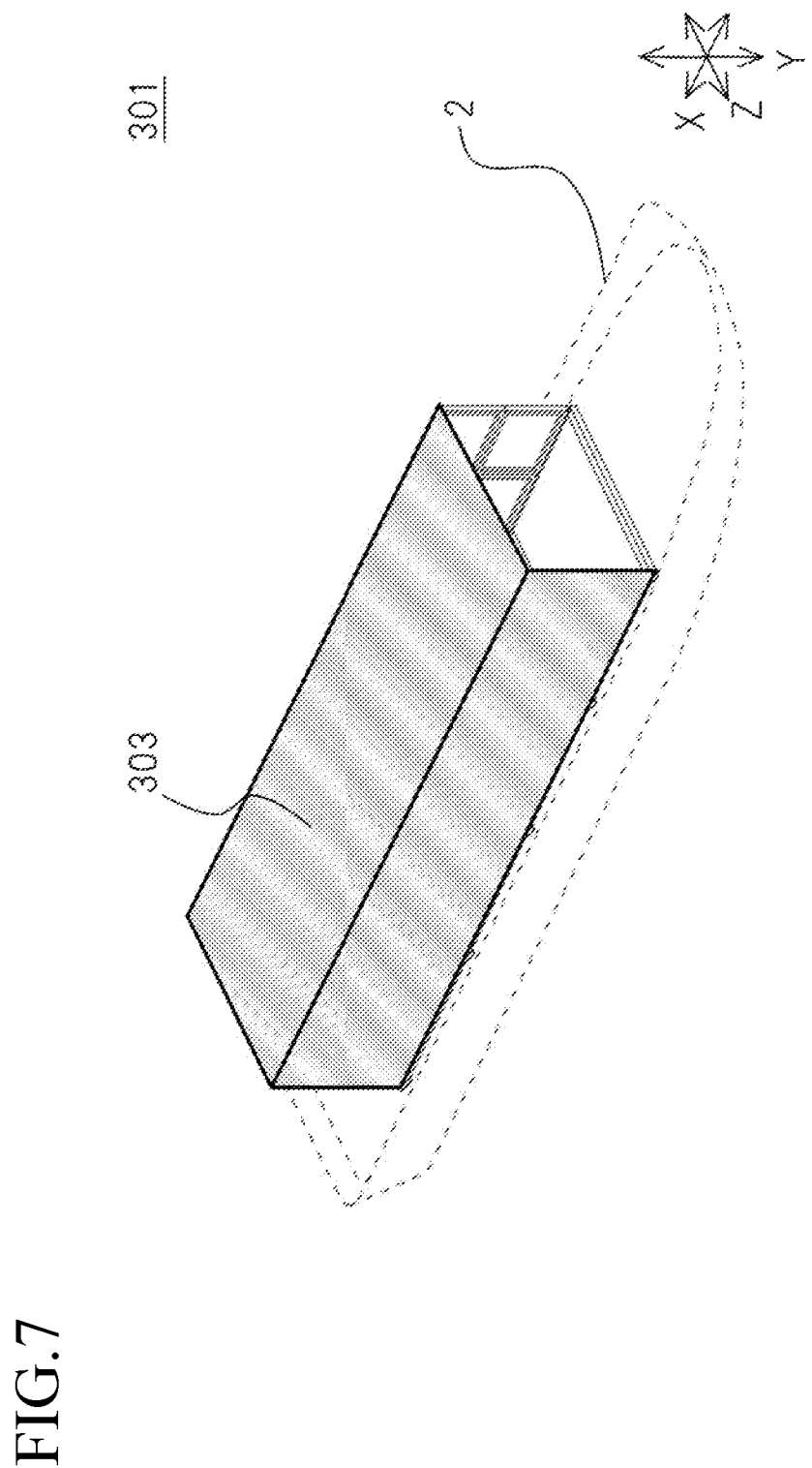
FIG. 7 is a schematic diagram illustrating the configuration of a shipboard advertising system (1) according to another embodiment.

As illustrated in FIGS. 5 and 6, a shipboard advertising system 101 of the second embodiment includes a telescopic movable screen set 106 and a projector 107.

The movable screen set 106 has two telescopic poles 161 that are telescopic in the vertical direction (Y direction), a screen 163 that is extended to match the length of the telescopic poles 161, and a storage container 162 for storing the screen 163 when the telescopic poles 161 are retracted.

One telescopic pole 161 is set on each side of an LED display set 3 in the longitudinal direction (X direction) of the vessel body 2, and is extended or retracted in the Y direction under the control of an image providing device 104.

The storage container 162 is a box-shaped member provided at the top of the LED display set 3 and is open at the top portion thereof. The storage container 162 has almost the same length in the X direction and the Z direction as the LED display set 3 at the top end of the LED display set 3.

The top end of the screen 163 is fixed near the top ends of the telescopic poles 161. The screen 163 is extended upward as the telescopic poles 161 are extended, and is stored in the storage container 162 as the telescopic poles 161 are retracted. The both sides of the screen 163 other than the top ends are not fixed to the telescopic poles 161, and thus get separated from the telescopic poles 161 and are stored in the storage container 162 as the telescopic poles 161 are retracted.

The screen 163 is not limited to a particular type, but a so-called mesh screen which is transparent and on which images can be projected from the rear or front side may preferably be used.

The projector 107 operates under the control of the image providing device 104, and projects, as advertising images, projection images supplied by the image providing device 104 onto the screen 163.

In the normal mode for the normal operation, the screen 163 is extended to be in an extended state, and diffuses projection light coming from the projector 107 to thereby display projection images. Since advertising images are allowed to be displayed on the screen 163 as well as on the LED display set 3, it is possible to display the advertising images using a larger area.

In the bridge mode for the bridge operation, the screen 163 is retracted to be in a storage state and is stored in the storage container 162. This makes it possible to lower the top of the shipboard advertising system 1 to be less than the height limit for passing under a bridge.

Operation and Effects

The following describes features derived from the above-described first embodiment, along with their effects, etc., as necessary. For easy understanding, the corresponding components in the above embodiments are indicated in parentheses or the like, but the components described below are not limited to the specific components indicated in the parentheses, etc. In addition, the meanings of terms, examples, and others used for the features may be applied as the meanings of terms and examples described in other features using the same wording.

With the above-described configuration, a shipboard advertising system of the present disclosure includes:

a vessel body part (vessel body 2) capable of sailing on water;

a first display unit (flat panel set 32) disposed to be inclined on the vessel body part;

a second display unit (flat panel set 32) disposed to be inclined on the vessel body part; and an image providing unit (image providing device 4) configured to supply advertising images to the first display unit and the second display unit, wherein the first display unit and the second display unit are arranged in such a manner that a first top side of the first display unit and a second top side of the second display unit are in close proximity to each other, a second bottom side of the first display unit and a second bottom side of the second display unit are apart from each other, and the first and second top sides of the first and second display units in close proximity to each other form a top-side angle ranging from 35° to 145°.

This makes it possible to let both target people on riverbanks and embankments and target people on bridges view the advertising images, which achieves effective advertising.

In the shipboard advertising system of the present disclosure, the image providing unit supplies, in a first mode, the advertising images whose top sides are not continuous, to the first display unit and the second display unit, respectively, and the image providing unit supplies, in a second mode, the advertising images whose top sides are continuous, to the first display unit and the second display unit, respectively.

This makes it possible to let people on riverbanks and embankments (people who look at the advertising images from an oblique upward angle) view the advertising images properly at normal times and to let people on bridges (people who look down at the advertising images from above) view the advertising images properly when the vessel body approaches the bridges, which achieves effective advertising.

The shipboard advertising system of the present disclosure further includes a bridge detection unit configured to detect a distance from a bridge, wherein the image providing unit transitions into the second mode upon determining that the distance to the bridge is within a predetermined visible range.

This makes it possible to automatically detect the bridge and switch the mode without needing the advertisement provider to do anything.

In the shipboard advertising system, the bridge detection unit is implemented using a global positioning system (GPS).

This makes it possible to detect the correct positional relationship with the bridge on the basis of the positional information of the vessel body 2 calculated using the GPS.

In the shipboard advertising system of the present disclosure, the bridge detection unit is implemented using a distance measuring sensor.

This makes it possible to detect the correct positional relationship with the bridge using the distance measuring sensor.

In the shipboard advertising system of the present disclosure, in the second mode, the image providing unit supplies the advertising images with a vertical and horizontal ratio adjusted for viewing from above, to the first display unit and the second display unit.

This makes it possible to let people on bridges view the advertising images properly adjusted for the straight downward line-of-sight YB when the vessel body approaches the bridges, which achieves effective advertising.

In the shipboard advertising system of the present disclosure, at least one of the first display unit or the second display unit is movable so as to rotate in a direction in which the first top side and the second top side are separated from each other.

This makes it possible to change the inclination angle of the display unit with respect to the deck. Therefore, in the first mode, the inclination angle is changed to be optimal for the vertical positions of passersby. In the second mode, the top end of the display unit is lowered to be at a safe position where the screen will not collide with a bridge, according to the height of the bridge.

The shipboard advertising system of the present disclosure further includes:

a screen (screen 163) configured to extend above the first display unit and the second display unit; and a projection device (projector 107) configured to emit projection light for displaying a projection advertising image to the screen.

This makes it possible to display the projection advertising image on the screen located above the first and second display units, in addition to the first and second display units, which makes the advertising images more visible to people and thus enhances the advertising effect.

The shipboard advertising system of the present disclosure further includes:

a telescopic unit configured to extend and retract the screen, wherein the screen is extended in the first mode, and the screen is retracted in the second mode.

This makes it possible to lower the top end of the screen to be at a safe position where the screen will not collide with a bridge, and to enlarge the screen in the first mode, irrespective of the height of the bridge.

With the above-described configuration, a shipboard advertising method of the present disclosure includes:

in supplying advertising images to a first display unit and a second display unit disposed on a vessel body part capable of sailing on water, the first display unit and the second display unit being arranged in such a manner that a first top side of the first display unit and a second top side of the second display unit are in close proximity to each other, a second bottom side of the first display unit and a second bottom side of the second display unit are apart from each other, and the first and second top sides of the first and second display units in close proximity to each other form a top-side angle ranging from 35° to 145°, a first mode step of supplying the advertising images whose top sides are not continuous, to the first display unit and the second display unit, respectively, and a second mode step of supplying the advertising images whose top sides are continuous, to the first display unit and the second display unit, respectively.

This makes it possible to arrange the display units so that they are visible from both the horizontal direction and the vertical upward direction, and to display the advertising images such that each advertising image on the first and second display unit is independently viewed in the first mode in which only one display unit is visible, and such that an advertising image is displayed using the first and second display units as one display unit in the second mode in which both display units are visible.

Third Embodiment

A second embodiment will now be described. The third embodiment differs from the first embodiment in that the third embodiment switches advertising images to be displayed according to the distance to a viewer. In the third embodiment, components that are identical to those in the first embodiment are given the same reference numerals. Each component that has a counterpart in the first embodiment is given the reference numeral used in the first embodiment plus 200. The description of the identical components will be omitted. While the third embodiment describes the arrangement illustrated in FIG. 8, where two flat panel sets 32 are placed in an upright position, this arrangement is applicable to any case illustrated in FIGS. 1, 7, 9, and 10.

Figure 8:
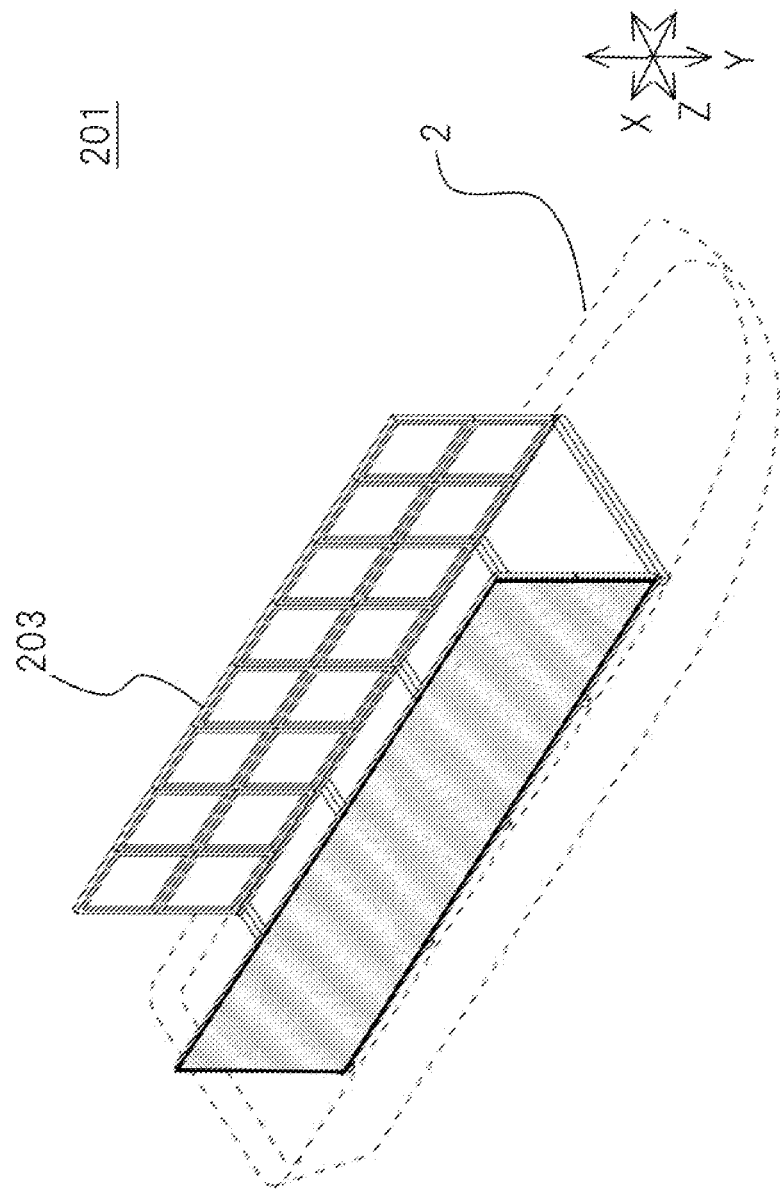
FIG. 8 is a schematic diagram illustrating the configuration of a shipboard advertising system (2) according to another embodiment.
Figure 11:
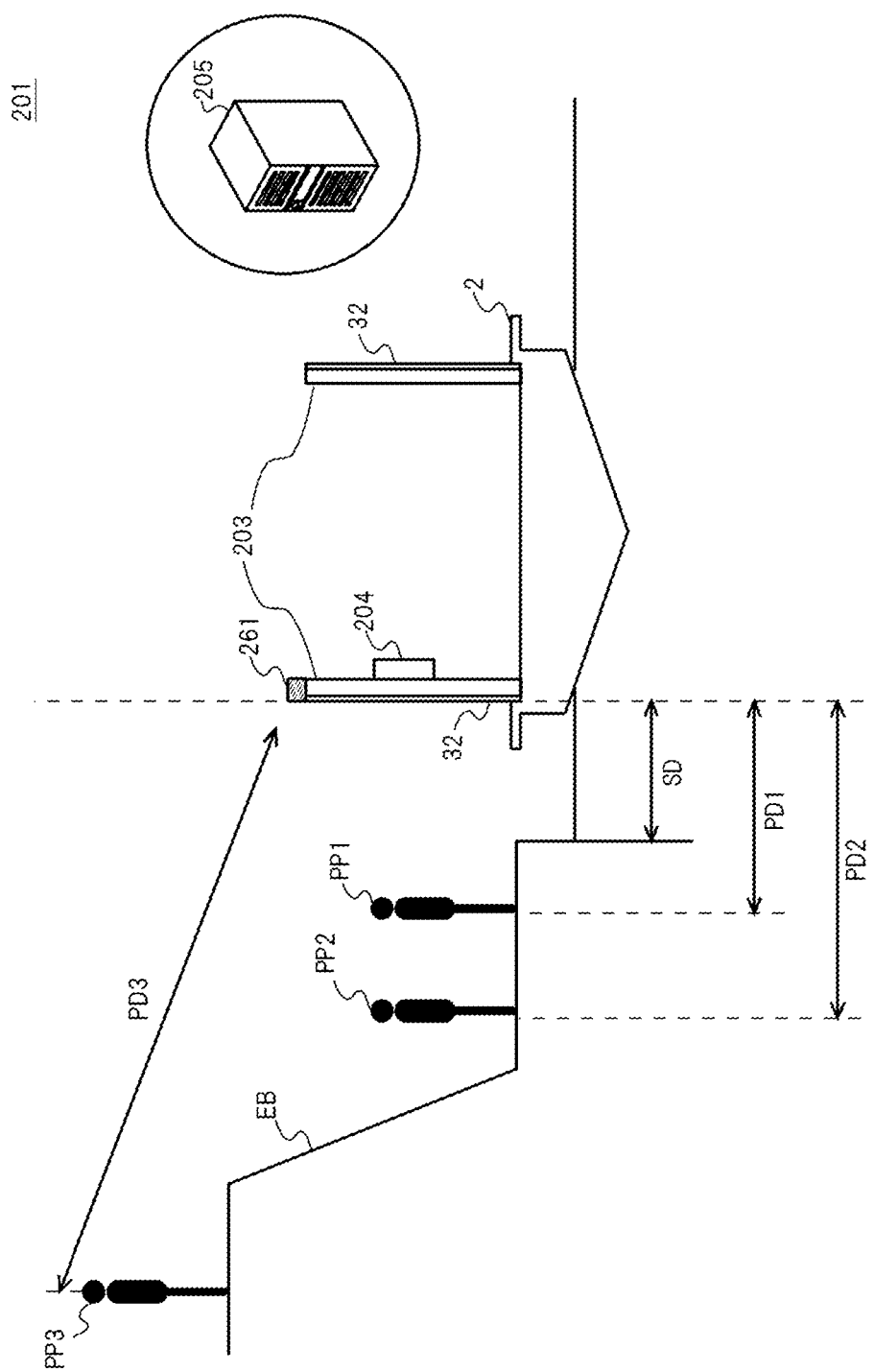
FIG. 11 is a schematic diagram illustrating the configuration of a shipboard advertising system according to a second embodiment.

In a shipboard advertising system 201 of the third embodiment, the two flat panel sets 32 are placed in an upright position, thereby forming an LED display set 203, as illustrated in FIGS. 8 and 11. A camera 263 is provided on the LED display set 203 (flat panel set 32). In this connection, the second embodiment does not switch advertising images according to the detection of a bridge or the existence or absence of the bridge. In addition, an image providing device 204 supplies advertising images respectively selected for the two flat panel sets 32, to them.

As illustrated in FIG. 11, viewers PP may be located at a plurality of positions such as the lower part and top part of an embankment EB, and the viewing distances PD (PD1 to PD3) from each viewer PP viewing an advisement to a flat panel set 32 (camera 263) are not equal. In addition, the viewing distance PD varies greatly due to some factors such as riverbanks present at different positions and the necessity to change the position of the vessel body 2 in the river width direction perpendicular to the traveling direction of the vessel body 2 due to the depth of water.

Therefore, the shipboard advertising system 201 switches advertising images to be displayed on the flat panel set 32, on the basis of a captured image obtained by the camera 263. In this connection, the following describes the case where the image providing device 204 employs the streaming playback method.

In the shipboard advertising system 201, the image providing device 204 and a server 205 are connected over a wireless network. The shipboard advertising system 201 selects advertising images according to the viewing distance PD based on the captured image data, and displays them on the flat panel set 32.

Figure 12:
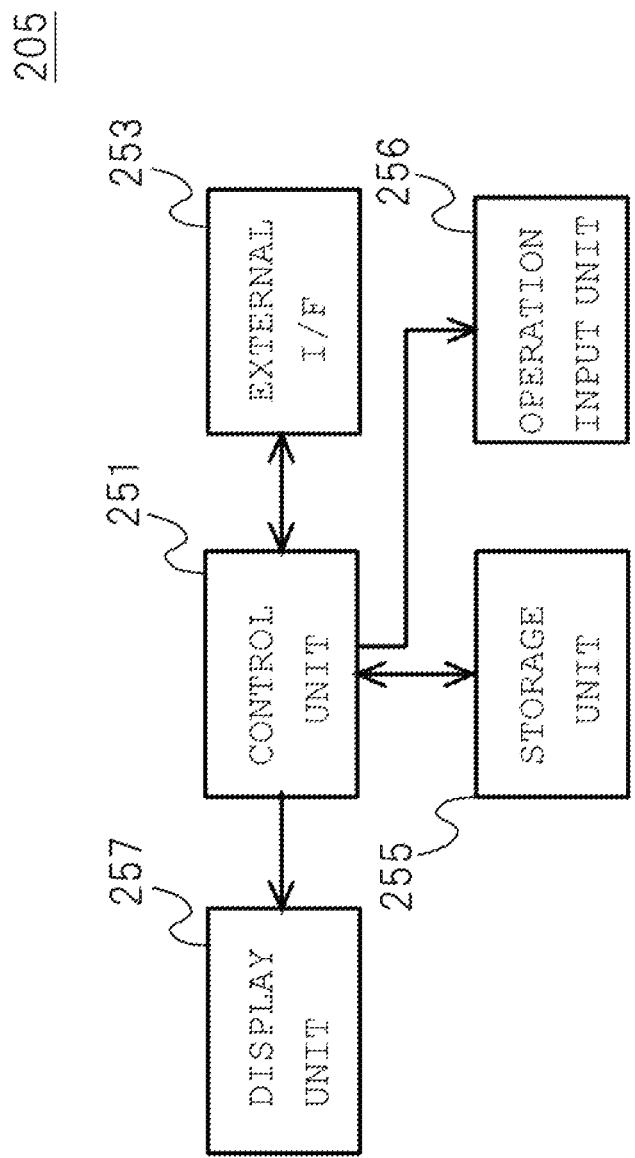
FIG. 12 is a schematic diagram illustrating an electrical block diagram of a server.

More specifically, the server 205 has a computer configuration, as illustrated in FIG. 12. A control unit 251 made up of a CPU, ROM, and RAM comprehensively controls the entire server 205, and performs an image display process according to an advertising image display program stored in advance in a storage unit 255. In this connection, an operation input unit 256 and display unit 257 are not mandatory.

The camera 263 is connected to the image providing device 204, and supplies captured image data to the image providing device 204 via an external interface 143 (not illustrated). This camera 263 is installed between the center of the top of the LED display set 203 and the edge thereof in the traveling direction (at the front portion in the traveling direction). Therefore, the camera 263 captures an image centered on a location in the front of the camera 263, closer to the front side in the traveling direction from the center of the flat panel set 32.

When receiving the captured image data from the camera 263, the control unit 241 of the image providing device 204 detects human bodies from the captured image data. In detecting human bodies, the faces of the human bodies or specific parts or whole (upper body, full body, or the like) of the human bodies may be detected. As a method of detecting human bodies, a desired known method, such as bodyline detection after skin color detection, eye detection, or face detection may be employed. The following describes a case of using face detection.

Figure 13:
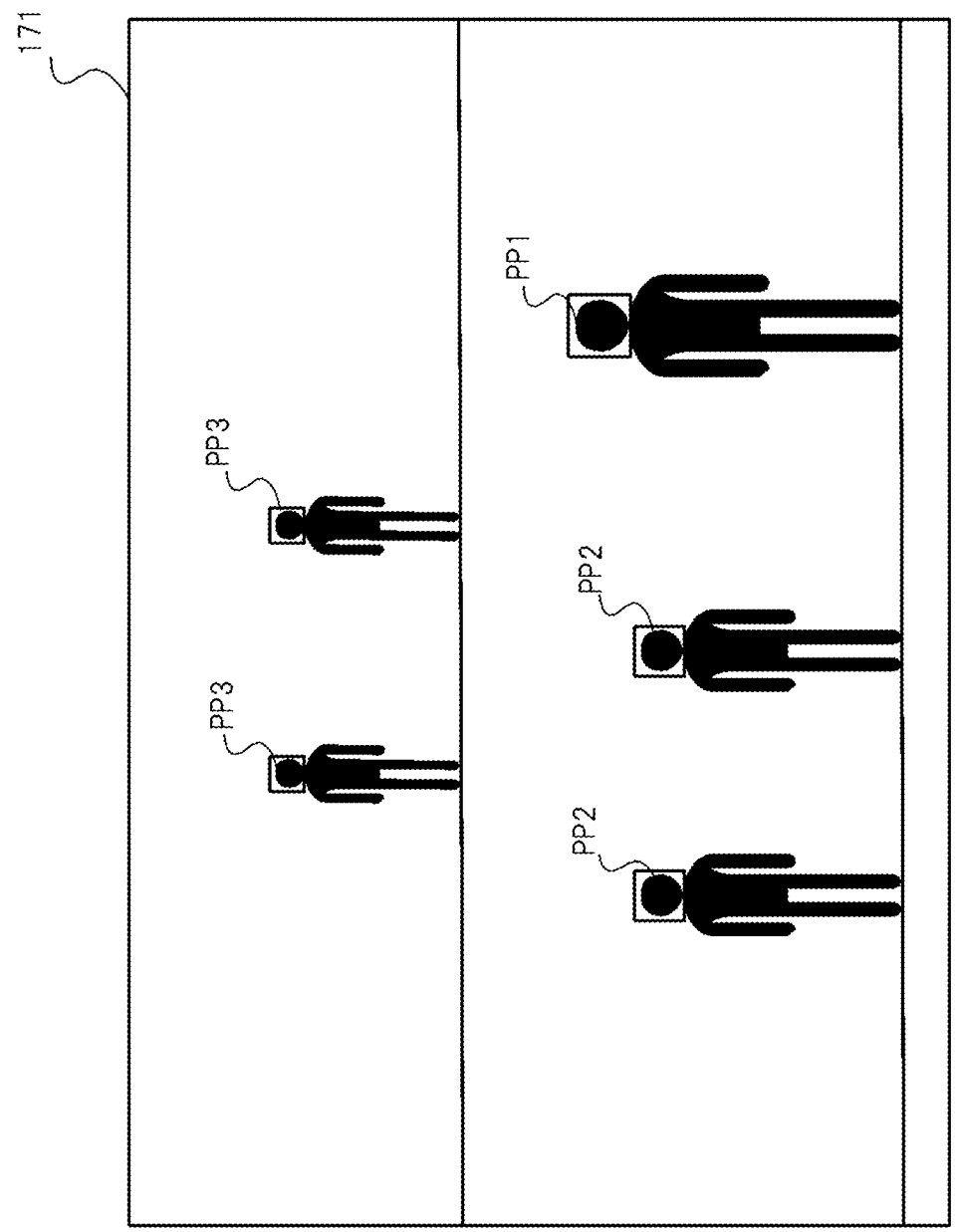
FIG. 13 is a schematic diagram for describing the relationship between face size and viewing distance.

Here, as illustrated in FIGS. 11 and 13, a captured image 171 based on captured image data has faces whose sizes depend on their viewing distances PD. Therefore, one advertising image is selected according to the detected face sizes from a plurality of prepared advertising images. The following describes a selection process that is performed by the control unit 241 of the image providing device 204 to select advertising images. Alternatively, the control unit 251 of the server 205 may perform the selection process.

The storage unit 245 of the image providing device 204 stores a selection table that associates a face size range and an advertising image with each other. When detecting the face of a human body, the control unit 241 selects one advertising image associated with the detected face size with reference to the selection table, and supplies an advertisement selection signal to the server 205.

When receiving the advertisement selection signal, the server 205 selects advertising image data specified by the advertisement selection signal from the plurality of advertising image data stored in advance in the storage unit 255, and supplies the advertising image data to the image providing device 204. As a result, advertising images suitable for the viewing distance PD is displayed on the flat panel set 32.

For example, in the case where the viewing distance PD is short, advertising images with small-sized characters are displayed since the viewer are located nearby. In the case where the viewing distance PD is long, on the other hand, advertising images with large-sized characters are displayed since the viewer is located at a distance. In other words, a face size substantially indicates a viewing distance.

In the case where a plurality of viewers have a plurality of viewing distances PD, as illustrated in FIG. 13, the control unit 241 calculates the average value of face size, and selects advertising images corresponding to the calculated average value. This makes it possible to select advertising images optimal for as many viewers as possible and to allow the viewers to view the optimal advertising images.

At this time, if a face size is smaller than a preset lower limit size, this face size may be excluded from the average value calculation. This makes it possible to select advertising images optimal for many viewers remaining after viewers who are hard to view the advertising images and are thus unlikely to get appealed by the advertisements are excluded.

Figure 14:
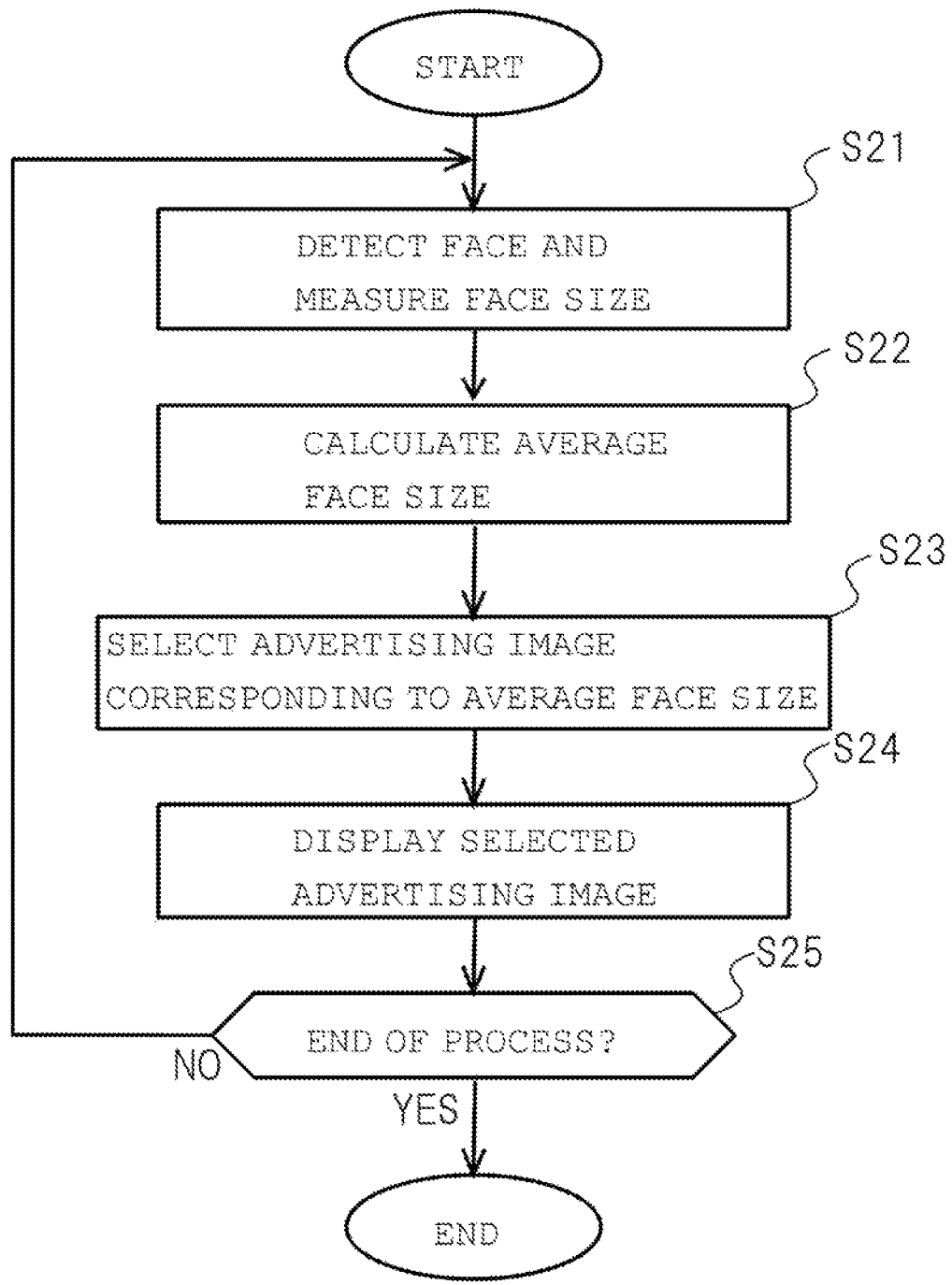
FIG. 14 is a flowchart for describing an image display process.

The following describes the image display process performed by the control unit 241 of the image providing device 204, with reference to the flowchart of FIG. 14.

The control unit 241 begins the image display process at a start step, and the process proceeds to next step S21.

At step S21, the control unit 241 detects the faces of viewers as parts of the viewers from a received captured image, and measures their face sizes. Then, the process proceeds to next step S21. At step S21, the control unit 241 calculates the average face size from the measured face sizes. Then, the process proceeds to next step S23.

At step S23, the control unit 241 selects an advertising image corresponding to the average face size. Then, the process proceeds to next step S24. At step S24, the control unit 241 displays the selected advertising image data on a display unit. Then, the process proceeds to next step S25.

At step S25, the control unit 241 determines whether to complete the image display process. If a negative result is obtained here, the process proceeds back to step S21, so that the control unit 241 keeps on the process. If an affirmative result is obtained at step S25, on the other hand, the process proceeds to an end step, at which the control unit 241 completes the process.

Operation and Effects

The following describes features derived from the above-described third embodiment, along with their effects, etc., as necessary.

With the above configuration, a shipboard advertising system (shipboard advertising system 201) of the present disclosure includes:

a vessel body part (vessel body 2) capable of sailing on water;

a display unit (flat panel sets 32) disposed on the vessel body part;

a viewing distance calculation unit (control unit 241) configured to calculate a viewing distance from the display unit to a viewer;

an image selection unit (control unit 241) configured to select an advertising image corresponding to the viewing distance; and an image providing unit configured to supply the selected advertising image to the display unit.

This makes it possible to display advertising images according to a viewing distance, which enhances the advertising effect by displaying the appropriate advertising images according the distance to the viewer.

The shipboard advertising system further includes a camera unit (camera 263) configured to capture an image of the viewer, wherein the viewing distance calculation unit estimates the viewing distance on the basis of a part size (face size) of at least a part of the viewer detected from the captured image received from the camera unit.

This makes it easy to estimate the viewing distance on the basis of the part size of the viewer that changes depending on the viewing distance.

In the shipboard advertising system, the viewing distance calculation unit estimates the viewing distance on the basis of an average value taken over part sizes of a plurality of viewers detected from the captured image.

The image providing unit supplies advertising images selected for the first display unit, to the first display unit, and advertising images selected for the second display unit, to the second display unit.

This makes it possible to display such appropriate advertising images for viewers even when the viewers are on both banks.

Other Embodiments

Figure 9:
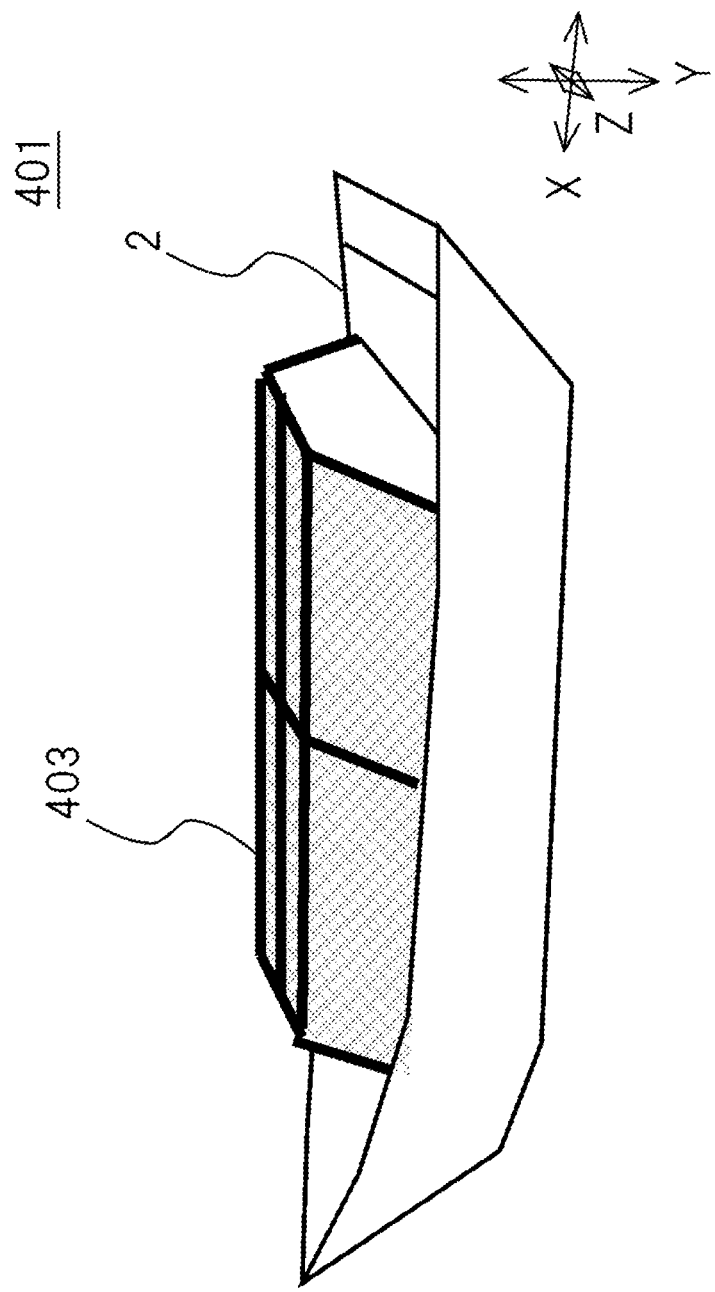
FIG. 9 is a schematic diagram illustrating the configuration of a shipboard advertising system (3) according to another embodiment.

While the above-described embodiments have described the case where the two flat panel sets 32 in the LED display set 3 are arranged such as to form a triangle in cross section, the arrangement is not limited thereto. For example, as with the LED display set 203 illustrated in FIG. 7, the two flat panel sets may be placed in an upright position at 90°, and another flat panel set may be placed so as to cover them, such that they form a rectangle in cross section. Alternatively, as illustrated in FIG. 8, the two flat panel sets may be placed in an upright position at 90°. Yet alternatively, as illustrated in FIG. 9, the two flat panel sets may be disposed to stand at 60° to 80° and another flat panel set is placed so as to cover them, such that they form a trapezoid in cross section. In any case, appropriate advertising images may be displayed according to the positions of target passersby by switching between the normal mode and the bridge mode.

In addition, at least one of the first display unit and the second display unit may be made movable. For example, the first and second display units may be placed in an upright position as illustrated in FIG. 8 in the normal mode, and may be deformed to form a triangle in cross section as illustrated in FIG. 1 in the bridge mode. It is also possible to move only one of them located closer to a riverbank or to switch it to deform one or both.

In addition, the switching of the advertising image data to be played does not need to be performed immediately after recognizing that the vessel body has entered or left the bridge visible area, but may be performed at timing when one piece of advertising image data has finished playing. It is also possible to select either the timing immediately after the vessel body has entered or left the bridge visible area or the timing when one piece of advertising image data has finished playing, depending on the length of the advertising image data.

Figure 10:
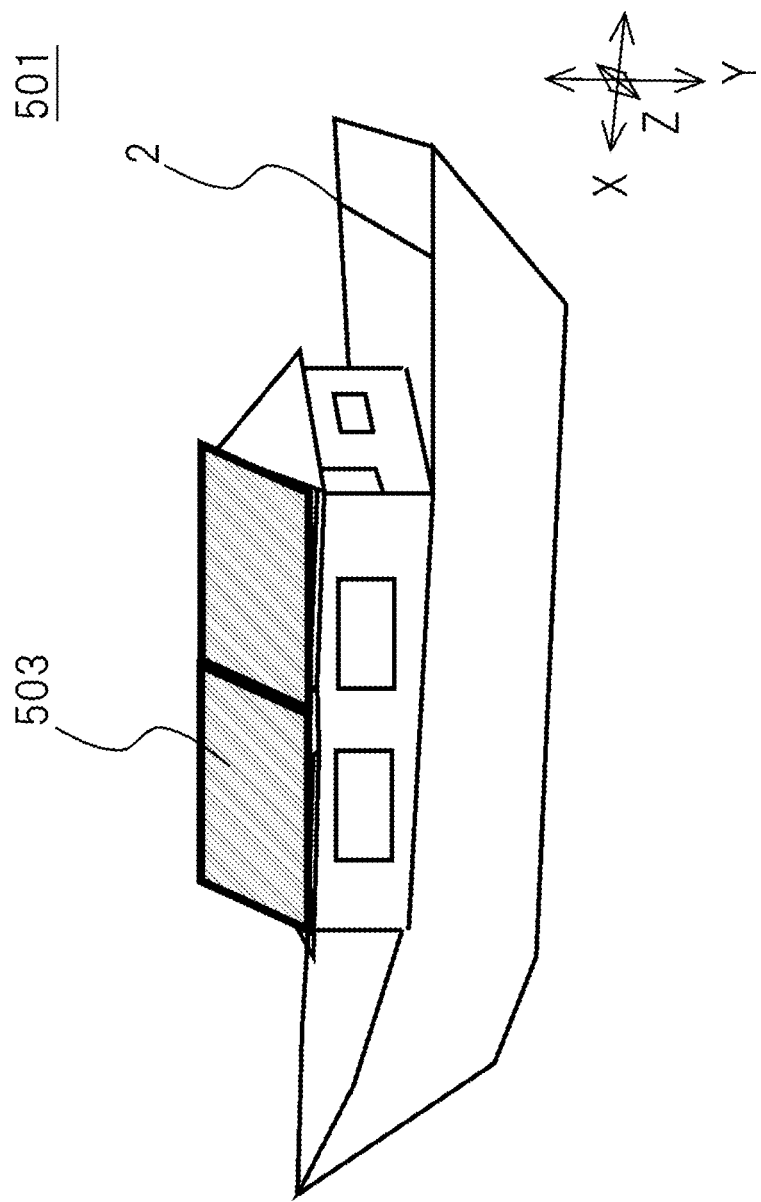
FIG. 10 is a schematic diagram illustrating the configuration of a shipboard advertising (4) system according to another embodiment.

While the above-described embodiments have described the case where the LED display set 3 is disposed on the deck, the present disclosure is not limited to thereto. For example, as illustrated in FIG. 10, the LED display set may be disposed on the roof of the vessel.

While the above-described embodiments employ the playback memory method in which the playlist is stored in the storage unit 45, the present disclosure is not limited thereto. The image providing device may be provided with only an external communication function. In this case, the image data of advertising images is supplied from an external control device via wireless communication such as the Internet or the like. Alternatively, the image providing device may store the image data only, and may receive playback instructions based on the playback list stored in the external control device.

While the above-described third embodiment has described the case of selecting advertising images corresponding to the average value of face size, the present disclosure is not limited to thereto. For example, face sizes may be counted for each of a plurality of size ranges, and advertising images corresponding to a size range with the highest count may be selected.

While the above-described third embodiment has described the case of selecting advertising images corresponding to the average value of face size with reference to the selection table, the present disclosure is not limited to thereto. For example, a threshold may be set, and advertising images may be selected based on whether the size exceeds the threshold.

While the above-described third embodiment has described the case where the image providing device 204 selects advertising images, the present disclosure is not limited to thereto. For example, a camera may be provided with a communication function so as to supply captured image data to a server, and the sever may detect faces, select advertising images based on the face size, and supply the selected advertising image data to the image providing device. Alternatively, the image providing device may send the average value of face size to the server, and the server may select advertising images based on the face size and supply the selected advertising image data to the image providing device.

While the above-described third embodiment has described the case of selecting different advertising images for the two flat panel sets 32, the present disclosure is not limited to thereto. For example, appropriate advertising images may be selected for only one of them located closer to a riverbank. This enables reducing the communication load and processing load of the image providing device and server.

While the above-described third embodiment has described the case of estimating a viewing distance on the basis of a captured image, the present disclosure is not limited to thereto. For example, a scanning laser type distance measuring sensor may be used. In this case, the topography is obtained beforehand with the distance measuring sensor, and the position of a viewer is determined by comparing measured data against the topography. In addition, the distance measuring sensor and a thermos-sensor may be combined to detect human bodies and the distances to the human bodies may be measured.

While the above-described embodiments have described the case of displaying advertising images on both the two flat panel sets 32, the present disclosure is not limited to thereto. For example, if one flat panel set is far from a riverbank, the other flat panel set may be turned off. It is preferable to turn on and off advertising images according to the landscape and the conditions of the advertising location.

While the above-described embodiments have described the case of storing a plurality of images with different character sizes as advertising images corresponding to viewing distances, the present disclosure is not limited to thereto. For example, it is also possible to change the sizes of graphics or images themselves. It is also possible to change the intensity of light without changing images, for example, to make the images darker when the viewing distance is short and brighter when the viewing distance is long. This avoids making nearby viewers feel dazzled and so uncomfortable, and also enables light to reach the viewers, even at a distance, to make it easier for the viewers to view the images.

While the above-described embodiments have disclosed the shipboard advertising system 1 that includes the vessel body 2 serving as a vessel body part, the two flat panel sets 32 serving as a first display unit and a second display unit, and the image providing device 4 serving as an image providing unit, the present disclosure is not limited to thereto. The shipboard advertising system may be configured with a vessel body part, a first display unit, a second display unit, and an image providing unit that each have another configuration.

INDUSTRIAL APPLICABILITY

The present disclosure is applicable to digital signage advertising on vessels, for example.

REFERENCE SIGNS LIST

1, 101, 201: shipboard advertising system
2: Vessel body
2A: Vessel body front end 3, 203: LED display set
4, 104, 204: Image providing device
21: Deck
22: Bulwark
31: Display
31A: Front surface
32: Flat panel set
32A: Top side
32B: Bottom side
41, 241: Control unit
43: External interface
45: Storage unit
46: Operation input unit
49: Bridge detection device
51: Cabinet
52: Joining member
53: Lower installation base
261: Camera
AG: Top-side angle

The invention claimed is:

1. A shipboard advertising system comprising:
a vessel body part capable of sailing on water;
a first display unit disposed to be inclined on the vessel body part;
a second display unit disposed to be inclined on the vessel body part; and
an image providing unit configured to supply advertising images to the first display unit and the second display unit, wherein
the first display unit and the second display unit are arranged in such a manner that a first top side of the first display unit and a second top side of the second display unit are in close proximity to each other, a second bottom side of the first display unit and a second bottom side of the second display unit are apart from each other, and the first and second top sides of the first and second display units in close proximity to each other form a top-side angle ranging from 35° to 145°,
the image providing unit supplies, in a first mode, separate advertising images that are visually discontinuous with each other with respect to the first display unit and the second display unit, and
the image providing unit supplies, in a second mode, a single continuous advertising image that spans across both the first display unit and the second display unit, respectively;
wherein the shipboard advertising system further comprises a bridge detection unit configured to detect a distance from a bridge, wherein
the image providing unit transitions into the second mode upon determining that the distance to the bridge is within a predetermined visible range; and
wherein, in the second mode, the image providing unit supplies the advertising images with a vertical-and-horizontal ratio adjusted for viewing from above, to the first display unit and the second display unit.

2. The shipboard advertising system according to claim 1, wherein the bridge detection unit is implemented using a global positioning system (GPS).

3. The shipboard advertising system according to claim 1, wherein the bridge detection unit is implemented using a distance measuring sensor.

4. The shipboard advertising system according to claim 1, wherein, in the second mode, the image providing unit supplies the advertising images with the vertical-and-horizontal ratio adjusted for viewing from above, wherein the vertical-and-horizontal ratio of the image is 1:1, to the first display unit and the second display unit.

5. The shipboard advertising system according to claim 1, wherein at least one of the first display unit or the second display unit is movable so as to rotate in a direction in which the first top side and the second top side are separated from each other.

6. The shipboard advertising system according to claim 1, further comprising:
a screen configured to extend above the first display unit and the second display unit; and
a projection device configured to emit projection light for displaying an image to the screen.

7. The shipboard advertising system according to claim 6, further comprising
a telescopic unit capable of extending and retracting the screen, wherein
the screen is extended in the first mode, and
the screen is retracted in the second mode.

8. A shipboard advertising method, comprising:
in supplying advertising images to a first display unit and a second display unit disposed on a vessel body part capable of sailing on water, the first display unit and the second display unit being arranged in such a manner that a first top side of the first display unit and a second top side of the second display unit are in close proximity to each other, a second bottom side of the first display unit and a second bottom side of the second display unit are apart from each other, and the first and second top sides of the first and second display units in close proximity to each other form a top-side angle ranging from 35° to 145°,
a first mode step of supplying the advertising images that are visually discontinuous with each other with respect to the first display unit and the second display unit, and
a second mode step of supplying the advertising images in a single continuous advertising image that spans across both the first display unit and the second display unit, respectively;
detecting a distance from a bridge,
transitioning into the second mode upon determining that the distance to the bridge is within a predetermined visible range; and
wherein, in the second mode, supplying the advertising images with a vertical-and-horizontal ratio adjusted for viewing from above, to the first display unit and the second display unit.

9. A shipboard advertising program that causes a computer to perform a process comprising:
in supplying advertising images to a first display unit and a second display unit disposed on a vessel body part capable of sailing on water, the first display unit and the second display unit being arranged in such a manner that a first top side of the first display unit and a second top side of the second display unit are in close proximity to each other, a second bottom side of the first display unit and a second bottom side of the second display unit are apart from each other, and the first and second top sides of the first and second display units in close proximity to each other form a top-side angle ranging from 35° to 145°,
a first mode step of supplying the advertising images that are visually discontinuous with each other with respect to the first display unit and the second display unit, and a second mode step of supplying the advertising images in a single continuous advertising image that spans across both the first display unit and the second display unit, respectively;
detecting a distance from a bridge,
transitioning into the second mode upon determining that the distance to the bridge is within a predetermined visible range; and
wherein, in the second mode, supplying the advertising images with a vertical-and-horizontal ratio adjusted for viewing from above, to the first display unit and the second display unit.

\* \* \* \* \*